United States Patent
Fong et al.

[11] Patent Number: 5,152,975
[45] Date of Patent: Oct. 6, 1992

[54] PROCESS FOR PRODUCING HIGH PURITY HYDROGEN

[75] Inventors: Wing-Chiu F. Fong, Yorktown Heights, N.Y.; Henry C. Chan, Bellaire, Tex.; Robert M. Suggitt, Wappingers Falls; Manuel E. Quintana, Scarsdale, both of N.Y.

[73] Assignee: Texaco Inc., White Plains, N.Y.

[21] Appl. No.: 669,796

[22] Filed: Mar. 15, 1991

[51] Int. Cl.$^5$ .............................. C01B 3/26
[52] U.S. Cl. ..................... 423/652; 423/655; 423/656
[58] Field of Search .............. 423/359, 651, 652, 655, 423/656

[56] References Cited

U.S. PATENT DOCUMENTS

| | | | |
|---|---|---|---|
| 3,479,298 | 11/1969 | Sze et al. | 252/373 |
| 3,839,847 | 10/1974 | Banikiotes et al. | 55/58 |
| 3,859,428 | 1/1975 | Massle | 423/651 |
| 3,864,465 | 2/1975 | Hoffert | 423/648 |
| 3,920,804 | 11/1975 | Seltzer | 423/650 |
| 3,965,253 | 6/1976 | Miller et al. | 423/652 |
| 4,025,318 | 5/1977 | Moody et al. | 48/213 |
| 4,077,779 | 3/1978 | Sircar et al. | 55/25 |
| 4,171,206 | 10/1979 | Sircar | 55/26 |
| 4,254,094 | 3/1981 | Hegarty | 423/648 |
| 4,333,744 | 6/1982 | Fuderer | 55/25 |
| 4,338,292 | 7/1982 | Duranleau et al. | 423/656 |
| 4,398,926 | 8/1983 | Doshi | 55/16 |
| 4,414,191 | 11/1983 | Fuderer | 423/359 |
| 4,447,410 | 5/1984 | Giammarco | 423/655 |
| 4,491,573 | 1/1985 | Stonner et al. | 423/652 |
| 4,553,981 | 11/1985 | Fuderer | 48/62 |
| 4,572,829 | 2/1986 | Fuderer | 423/359 |
| 4,592,860 | 6/1986 | Fuderer | 252/376 |
| 4,592,903 | 6/1986 | Osman et al. | 423/359 |
| 4,654,063 | 3/1987 | Anvil et al. | 62/18 |
| 4,696,680 | 9/1987 | Ghate et al. | 55/25 |
| 4,711,773 | 12/1987 | Mesters et al. | 423/655 |
| 4,725,381 | 2/1988 | Pinto | 252/376 |
| 4,732,596 | 3/1988 | Nicholas et al. | 62/18 |
| 4,740,222 | 4/1988 | Mehra | 62/17 |
| 4,778,670 | 10/1988 | Pinto | 423/650 |
| 4,790,858 | 12/1988 | Sircar | 55/25 |
| 4,836,833 | 6/1989 | Nicholas et al. | 55/16 |
| 4,869,894 | 9/1989 | Wang et al. | 423/652 X |
| 4,891,187 | 1/1990 | Jungfer et al. | 423/248 |
| 4,897,253 | 1/1990 | Jenkins | 423/651 |
| 4,906,448 | 3/1990 | Sauvion et al. | 423/437 |
| 4,908,199 | 3/1990 | Sauvion et al. | 423/437 |
| 4,963,339 | 10/1990 | Krishnamurthy et al. | 423/437 |
| 4,980,145 | 12/1990 | Hsiung et al. | 423/437 |
| 5,000,925 | 3/1991 | Krishnamurthy et al. | 422/189 |

*Primary Examiner*—Ferris Lander
*Attorney, Agent, or Firm*—Robert A. Kulason; James J. O'Loughlin; Dominick G. Vicari

[57] ABSTRACT

A process for producing high purity hyrogen is disclosed. Specifically, the process includes (1) partially oxidizing a gaseous hydrocarbonaceous feedstock to produce a synthesis gas mixture of carbon monoxide and hydrogen, (2) reacting the synthesis gas mixture with steam to convert the carbon monoxide into a raw gas mixture which primarily includes carbon dioxide and hydrogen, and (3) subjecting the raw gas mixture to pressure swing adsorption to purify the raw gas mixture, thereby producing high purity hydrogen and a reject gas mixture of impurities.

The gaseous hydrocarbonaceous feed is specific, inasmuch as it is characterized by containing a major component which includes at least one $C_1$-$C_3$ hydrocarbon and which has an average molecular weight of up to about 30.

29 Claims, 1 Drawing Sheet

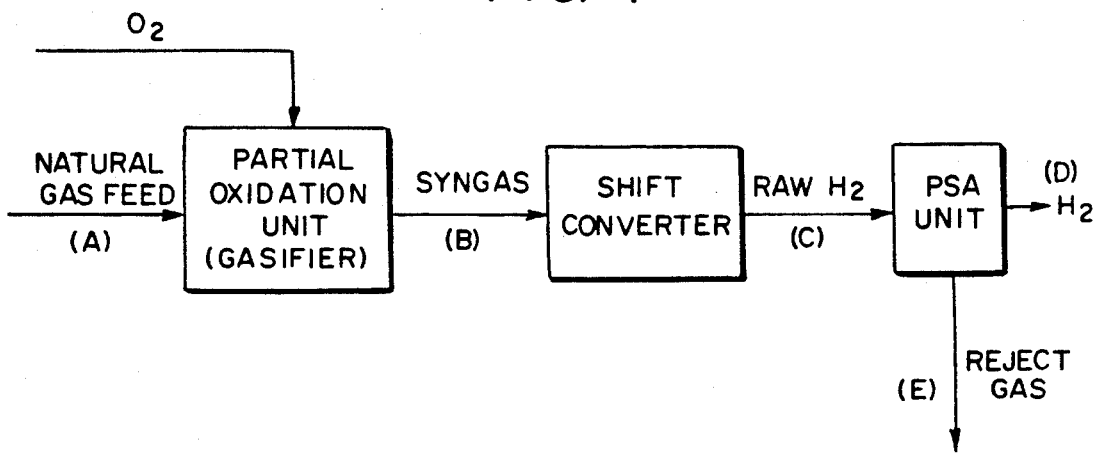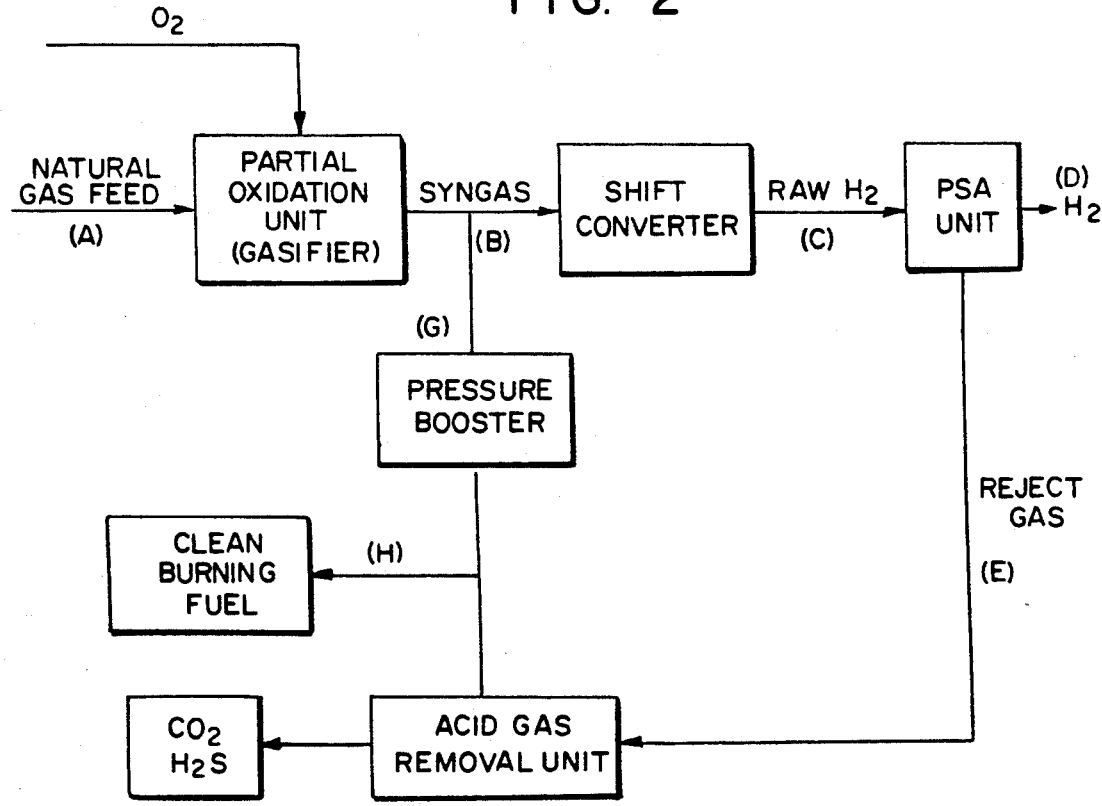

PROCESS FOR PRODUCING HIGH PURITY HYDROGEN

BACKGROUND OF THE INVENTION

1. Field of the Invention

The present invention relates generally to a process for producing hydrogen and, more particularly, to a process for producing high purity hydrogen from a specific hydrocarbonaceous feedstock.

2. Description of Background Art

There are a variety of known processes for producing hydrogen. Some of the more frequently employed processes include steam reforming of natural gas or naphtha, catalytic reforming of hydrocarbons boiling in the range of heavy straight run (HSR) gasoline or heavy oils (e.g., fuel oil), and the partial oxidation of heavy oils or natural gas. Steam reforming of natural gas is perhaps the most widely employed process for producing hydrogen. However, natural gas can contain certain sulphur species; typically hydrogen sulphide. Since reforming catalysts are extremely sulphur sensitive, the natural gas must undergo expensive pretreatment for sulphur removal, as is known by those skilled in the art.

To our knowledge, the use of the subject feedstock for the production of high purity hydrogen in a process which includes the sequence of steps described hereinbelow has, heretofore, never been offered. It is further believed that the instant method of producing pressurized, high purity hydrogen has also, heretofore, been unknown.

U.S. Pat. No. 3,545,926 describes a process for generating hydrogen from liquid hydrocarbons by partial oxidation followed by a water gas shift reaction and carbon dioxide removal.

U.S. Pat. No. 3,874,592 describes a burner for the partial oxidation of hydrocarbons to synthesis gas.

Commonly assigned U.S. patent application Ser. No. 614,335, filed Nov. 16, 1990, describes a process for producing high purity hydrogen from a refinery offgas feedstock. In particular, the process includes (1) partially oxidizing a refinery offgas feedstock to produce a synthesis gas mixture of carbon monoxide and hydrogen, (2) reacting said synthesis gas mixture with steam to convert said carbon monoxide into a raw gas mixture which primarily includes carbon dioxide and hydrogen, and (3) purifying said raw gas mixture to produce high purity hydrogen and a reject gas mixture of impurities.

U.S. Pat. No. 4,553,981 describes a process for hydrogen recovery from effluent gas streams. In particular, the effluent gas stream from steam reforming, partial oxidation or coal gasification operations are treated in shift conversion, scrubbing and pressure swing adsorption units for recovery of a purified hydrogen-containing product gas stream. After treatment by partial oxidation and high temperature shift conversion, the effluent stream typically has a composition, in mole percent on a dry basis, of 60-65 percent hydrogen and 30-35 percent carbon dioxide. The '981 patent teaches that a major portion (i.e., more than 70%, preferably 85-99.9%) of the carbon dioxide in the shift conversion effluent stream must be removed via scrubbing before being subjected to pressure swing adsorption for final purification. The high levels of carbon dioxide in the shift conversion effluent stream would result from charging a "heavy" hydrocarbon feed upstream to the partial oxidation unit.

Those skilled in the art certainly appreciate the economic disadvantages associated with a process for producing hydrogen that requires a scrubbing step. The space and costs relating to the installation and operation of the scrubber and equipment associated therewith, e.g., the conduits and refrigeration equipment, to name a few, result in a demand for a more economical approach. In fact, the scrubber and equipment associated therewith can constitute up to 50 percent of the total capital cost required to construct the processing equipment.

Accordingly, a process for producing high purity hydrogen which circumvents the need for practicing the expensive scrubbing step would be a significant contribution to those skilled in the art. In other words, this objective would be satisfied in a process where it is unnecessary to remove a major portion of carbon dioxide from the shift conversion effluent stream prior to subjecting said stream to purification by pressure swing adsorption.

SUMMARY OF THE INVENTION

The present invention is directed to a process for producing high purity hydrogen which comprises (1) partially oxidizing a gaseous hydrocarbonaceous feedstock to produce a synthesis gas mixture of carbon monoxide and hydrogen, said feedstock having a major component which includes at least one $C_1$-$C_3$ hydrocarbon and said major component having an average molecular weight of up to about 30, (2) reacting said synthesis gas mixture with steam to convert said carbon monoxide into a raw gas mixture which primarily includes carbon dioxide and hydrogen, and (3) subjecting said raw gas mixture to pressure swing adsorption to purify said raw gas mixture, thereby producing high purity hydrogen and a reject gas mixture of impurities.

In another embodiment, the process of this invention further comprises recycling part of the reject gas mixture of impurities in a manner such that the reject gas mixture comingles with the synthesis gas mixture, whereby the reject gas mixture is permitted to react with steam to convert carbon monoxide remaining in the reject gas mixture into hydrogen and carbon dioxide, thereby enhancing the production of high purity hydrogen.

In another embodiment, the process of the present invention further comprises recovering a substantial amount of hydrogen sulphide present in the reject gas mixture and processing the hydrogen sulphide to produce elemental sulphur.

In still another embodiment, the process of the present invention further comprises directing the reject gas mixture to a burner to enable the reject gas mixture to be used as a clean burning fuel source. The fuel can be employed as a source of energy to preheat the partial oxidation feedstock, or for other processes being practiced in the installation (for instance, the refinery or petrochemical plant).

The present invention further relates to a process for producing a pressurized, high purity hydrogen product which comprises the steps of: (1) pressurizing a gaseous hydrocarbonaceous feedstock to a pressure slightly above the desired pressure of the hydrogen product, said feedstock having a major component which includes at least one $C_1$-$C_3$ hydrocarbon and said major component having an average molecular weight of up to about 30; (2) partially oxidizing said feedstock to produce a synthesis gas mixture of carbon monoxide and hydrogen; (3) reacting said synthesis gas mixture with steam to convert said carbon monoxide into a raw gas mixture which primarily includes carbon dioxide and hydrogen; and (4) subjecting said raw gas mixture to pressure swing adsorption to purify said raw gas mixture thereby producing said pressurized, high purity hydrogen and a reject gas mixture of impurities.

Advantageously, when the process of this invention is employed for the preparation of high purity hydrogen from the feedstock described hereinbelow, a host of shortcomings typically associated with the known methods of producing hydrogen (e.g. steam reforming) are overcome. For instance, no pretreatment of the feedstock is required and the production of the environmentally unsafe $NO_x$ species is eliminated. Also an $H_2$ product compressor is not required in the practice of the present invention since the instant process can be performed at high pressures, i.e., up to about 1200 psig and any compression can occur at the outset of the process. In steam methane reforming the pressure limitations are up to about 300 psig. Furthermore, the present process is more energy efficient, inasmuch as the process steps are exothermic and, as a result, energy is produced. In contrast, steam methane reforming is an endothermic process which requires heat input to produce $H_2$. As a result, the present process consumes from about 10 to about 15 percent less natural gas than steam methane reforming.

The advantages associated with the process of this invention over the process described in U.S. Pat. No. 4,553,981 will also be apparent to those skilled in the art.

BRIEF DESCRIPTION OF THE DRAWINGS

FIG. 1 is a schematic illustration of the steps involved in practicing the process of the present invention; and FIG. 2 is a schematic illustration of an alternative embodiment of the present invention.

DESCRIPTION OF THE PREFERRED EMBODIMENTS

The feedstock used in the process of this invention is generally described as a gas containing a mixture of hydrocarbons. More specifically, a significant characteristic of the feed employed in the process of this invention is that a major portion, that is, a substantial amount, of the hydrocarbons in the gas are at least one and, more practically, a mixture of $C_1$-$C_3$ hydrocarbons having an average molecular weight of up to about 30. That is to say, the hydrocarbon feed is dominated by a major component including at least one $C_1$-$C_3$ hydrocarbon(s), the combination (the major portion) of which has an average molecular weight of up to about 30. Accordingly, only trace amounts of heavier hydrocarbons should be present in the feed.

By using the gaseous hydrocarbon feed described above in the process of the present invention, the shift conversion effluent stream will not contain as high a concentration of carbon dioxide as that described in U.S. Pat. No. 4,553,981 and, as a result, the expensive scrubbing step required in the process described in the '981 patent is circumvented. Also, the ratio of H:$CO_2$ in the shift conversion effluent stream will be greater when one practices the process of the present invention. Inasmuch as hydrogen is the desired end product, this is yet another advantage associated with the instant process.

By way of illustration, natural gas is representative of the type of feed contemplated herein. In fact, natural gas is a preferred feedstock. A typical natural gas composition is given below in Table I. All values identified are representative of the mole percent unless otherwise indicated.

TABLE I

| Component | Concentration |
|---|---|
| $H_2$ | 0-5 |
| $N_2$ | 0-2 |
| $CH_4$ | 60-98 |
| $C_2H_6$ | 2-20 |
| $C_3H_8$ | 1-10 |
| $C_4H_{10}$ | 0-5 |
| $C_5{}^+$ | 0-5 |
| $CO_2$ | 0-3 |
| $H_2S$ | 0-200 ppm |
| $H_2O$ | 0-saturated |

As shown in Table I, a substantial amount (major component) of the hydrocarbons present in the natural gas composition are $C_1$-$C_3$ hydrocarbons (predominantly methane), having, in combination, an average molecular weight of about 30.

Another preferred feedstock used in the process of this invention can include natural gas in combination with refinery offgas. Refinery offgas, as used herein, generally refers to the various gas streams generated by the individual processing units which are typically present in a refinery. Refinery offgas generally contains saturated and unsaturated hydrocarbons and other impurities, such as organic sulphur, nitrogen species, and inorganic agents including $H_2S$, COS, $SO_x$, $NH_3$, HCN, and arsine. Some particular components include $H_2$, $N_2$, $O_2$, RSH, $CH_4$, $C_2H_4$, $C_2H_6$, $C_3H_6$, $C_3H_8$, $C_4H_8$, $C_4H_{10}$, $C_5H_{12}$, CO, $CO_2$, and $H_2O$. The processing units which can produce offgas and, hence, the supplemental component used in the feed for the instant process, can include the fluid catalytic cracking (FCC) unit, thermal cracking units such as a residual coking, delayed coking or fluidized coking units, the catalytic reforming (CR) unit, the hydrotreating (HT) unit, and the pressure swing adsorption (PSA) unit. The offgas stream from the FCC unit is particularly preferred.

Refinery offgas is generally characterized as including up to about 40 percent by volume of hydrogen and typically has an energy value of at least about 700 Btu/SCF.

Table II is provided to illustrate the concentration of the components present in the supplemental offgas feedstock. A typical composition of a preferred offgas stream from a FCCU cryogenic residue unit is also provided in Table II.

TABLE II

| Component | Mole Percent Range | FCC Unit Offgas* |
|---|---|---|
| $H_2$ | 8-40 | 19.54 |
| $N_2$ | 0-10 | 7.41 |
| $CH_4$ | 20-60 | 40.47 |
| $C_2H_4$ | 1-25 | 17.79 |
| $C_2H_6$ | 1-20 | 14.37 |
| $C_3H_6$ | 0-20 | 0.06 |
| $C_3H_8$ | 0-20 | 0.37 |
| $C_4H_8$ | 0-5 | — |
| $C_4H_{10}$ | 0-8 | 1.0 |
| $C_5+$ | 0-5 | — |
| CO | 0-5 | 1.0 |
| $CO_2$ | 0-5 | 250 ppm |
| $O_2$ | — | 1000 ppm |
| Acetylene | — | 100 ppm |
| Diolefins | — | 100 ppm |
| Aromatics | — | 200 ppm |
| RSH (mercaptans) | — | 10 ppm |
| $H_2S$ | 0-4 | 10 ppm |

TABLE II-continued

| Component | Mole Percent Range | FCC Unit Offgas* |
|---|---|---|
| COS | 0–1 | 10 ppm |
| $SO_x$ | — | 15 ppm |
| $NH_3$ | — | 5 ppm |
| HCN | — | 10 ppm |
| Arsine | — | 20 ppb |
| Btu/SCF | 700–1400 | 1027 |

*Values represent mole percent unless indicated otherwise.

Although the preferred supplemental offgas feed used in the present process is of FCC origin, it is to be understood that offgases from other petroleum and chemical processing units can be used and may also contain species which require removal or destruction before the offgas can be combusted. For example, waste gas streams containing organic nitrogen compounds, such as amines or nitriles, when burned (fully combusted) produce $NO_x$ in amounts that exceed environmental discharge limits. Advantageously, in accordance with the present invention, the partial oxidation of organic nitrogen compounds generates only nitrogen, a limited amount of ammonia, and a trace of hydrogen cyanide. The latter fixed nitrogen compounds are easily separated and $NO_x$ formation on burning the syngas containing only $N_2$ is minimized.

Another of the numerous advantages associated with the process of the present invention resides in the ability to deliver a pressurized hydrogen product without having to subject the end product (i.e., hydrogen) to compression and without having to compress any of the effluent gas streams generated during the practice of the present processing steps. Specifically, any gas compression required to produce a pressurized hydrogen product occurs prior to charging the feed to the partial oxidation unit. Advantageously, at this stage the volume of gas to be compressed is at a minimum. In particular, the synthesis gas generated in the first step of the present process has a substantially increased volume relative to the volume of the feed, since there are more moles of synthesis gas produced than are present in the initial feed. By way of illustration, in the partial oxidation of a natural gas feed, which predominantly contains methane, synthesis gas is produced pursuant to the following reaction:

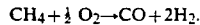

$$CH_4 + \tfrac{1}{2} O_2 \rightarrow CO + 2H_2.$$

Thus, 1.5 moles of feed gas produces 3 moles of synthesis gas and, accordingly, a twofold volumetric increase is exhibited. In addition, when the carbon monoxide is reacted with steam in the shift conversion step described below, additional gas volume is generated, including hydrogen. Hence, as one skilled in the art will readily appreciate, energy and cost savings are obtained by compressing the feed material rather than the product.

Insofar as the desired pressure of the hydrogen product is known, the feed component should be pressurized, if necessary, to a pressure slightly above (e.g., about 50 psig) the desired product pressure, prior to being introduced into the partial oxidation unit. Similarly, the oxygen fed into the partial oxidation unit to support the partial oxidation reaction should be pressurized slightly above the desired product pressure. The excess pressure is offset by the minute loss of pressure during the practice of the present process, as is understood by those skilled in the art.

In the practice of the present invention, the gas feed described above is preheated to a temperature of between about 200° F. to 700° F. The feed can be heated, for instance, in a fire heater or a heat exchanger.

In the first step of the present process, the gas feed is partially oxidized to produce a synthesis gas mixture of carbon monoxide and hydrogen. More specifically, as shown in FIG. 1, the preheated natural gas feed (used for illustrative purposes) is charged into a partial oxidation unit at a rate of about 4 million to about 40 million standard cubic feet per day (mmscfd). As discussed above, the pressure of the natural gas feed substantially corresponds (slightly higher) to the desired pressure of the end product, i.e., the hydrogen. As shown, the partial oxidation unit is also charged with an $O_2$ stream to permit the partial oxidation of the natural gas feed. The $O_2$ stream is similarly pressurized to a pressure that substantially corresponds to the desired pressure of the hydrogen product. The $O_2$ is introduced separately from the natural gas feed into the partial oxidation unit by a partial oxidation burner, such as the one described in U.S. Pat. No. 3,874,592. The oxygen consumption rate is typically between about 115 tons per day to about 1400 tons per day.

In a preferred embodiment, the partial oxidation unit is a gasifier which includes a refractory-lined pressure vessel and auxiliary gas cooling means, such as a heat recovery steam generator or a quenching chamber, which is further discussed hereinbelow. The gasifier is typically operated at a temperature of about 2200° F. to about 2800° F. and a pressure of from about 200 psig to about 1200 psig. Inasmuch as the process can be practiced at these elevated pressures, a final and more complicated compression of the hydrogen so produced, is not required.

The residence time of the reactants in the partial oxidation unit is usually about 2 to about 4 seconds. Thus, a predetermined quantity of the feed gas is partially oxidized in the gasifier in about 2 to about 4 seconds. In the partial oxidation unit, synthesis gas ("syngas") (i.e., carbon monoxide and hydrogen) is produced, preferably in an amount of at least about 2–3 moles of syngas per mole of gas feed.

Internal steam is also generated in the partial oxidation unit (gasifier) by quenching the syngas product produced therein, which is advantageously employed in the shift converter as described with particularity below. Before the syngas exits the partial oxidation unit, it is cooled in a quenching medium, such as water. The means for quenching the syngas (e.g., quench bath) can be contained in the partial oxidation unit or, alternatively, can be disposed outside of the unit and positioned in a manner such that the syngas can be directed through the quenching means and, thereafter, directed into the carbon monoxide shift converter.

The syngas mixture generated in accordance with the present invention includes a hydrogen content of at least about 59 percent by volume and a carbon monoxide content of at least about 30 percent by volume. The syngas mixture generated in accordance with the present process is desired since more hydrogen is produced and less CO is produced, which means that the CO shift converter is used less than would be required with heavier hydrocarbonaceous feedstocks.

In the next step, the syngas stream is directed from the partial oxidation unit into the shift converter. More particularly, hot synthesis gas from the gasifier is quickly cooled by direct contact with water, as described above, at the pressure of the synthesis gas generator (gasifier) and passed directly to the carbon monoxide shift conversion reactor. As described in U.S. Pat. No. 3,545,926, sufficient water is vaporized into the hot synthesis gas to supply the steam required for the shift conversion reaction. The steam is reacted with the carbon monoxide present in the syngas to produce a raw gas mixture of carbon dioxide and hydrogen. With operating pressures circa 1000 psi, the equilibrium temperature of the quenched synthesis gas is near 500° F. Since the shift converter operates at temperatures from 500° to 950° F., preferably 550° F. to 900° F., it may be necessary to warm the inlet gas to the shift converter by heat exchange against the exit gas. The carbon monoxide shift reaction which produces hydrogen and carbon dioxide is slightly exothermic and the temperature of the gas rises across the shift catalyst to a temperature circa 700° F. to 950° F., depending upon the amount of carbon monoxide present and equilibrium conditions.

In a preferred embodiment, at least about ninety (90) percent of the carbon monoxide is converted to carbon dioxide and hydrogen. The shift conversion reaction is preferably conducted in one or more fixed-bed catalytic reactors disposed in the shift converter. In the present process, the shift conversion reaction advantageously occurs in two stages or, more appropriately, two shifts. Typically, a three (3)-stage shift conversion is employed in conventional processes for producing high purity hydrogen. Where more than one fixed-bed reactor is employed, cooling means, which by way of illustration can include an intercooler or a heat exchanger, are positioned between the various beds to prevent the temperature from getting too high, as this would adversely affect the equilibrium conversion. It is desirable to maintain the reaction temperature within a range of about 600° F. to about 1000° F. in the first shift (or stage) and from about 500° F. to about 800° F. in the second shift. Preferably, the temperature is maintained at about 850° F. in the first shift and about 650° F. in the second shift.

The catalyst employed in the shift conversion reaction preferably includes chromium and iron oxide as is known by those skilled in the art. This catalyst is used to promote the following shift reaction: $CO + H_2O \rightarrow CO_2 + H_2$.

The shift conversion reactor also serves to destroy or retain unwanted contaminants present in the feedstock. For example, hydrogen cyanide is hydrolyzed to form ammonia, hydrogen and carbon dioxide.

The raw gas effluent from the shift conversion step of the present process includes up to about 71 percent hydrogen, no more than about 26 percent carbon dioxide, with the remaining 3 percent being carbon monoxide and other trace components.

The next step of the present process involves purifying the raw gas mixture produced in the shift conversion reaction described above. The gas effluent exiting the shift converter consists primarily of raw carbon dioxide and hydrogen. Impurities present in the raw gas mixture typically include nitrogen, carbon monoxide, methane, hydrogen sulphide, and water. After the synthesis gas has been treated in the carbon monoxide shift converter, it is cooled to remove water. Any chloride, now present as HCl, and ammonia condense out with the water and are removed from the gas. Accordingly, the impure gas effluent is directed from the shift converter and is directly introduced into a hydrogen purification unit to remove remaining impurities from the raw effluent stream.

Any conventional means for effecting the purification can be employed. However, in a highly preferred embodiment, the purification step is performed by pressure swing adsorption and, hence, the purification unit employed is a Pressure Swing Adsorption (PSA) unit (as shown) which removes the impurities from the raw stream by use of a pressure change on the adsorbent beds. This facilitated means of acid-gas removal and hydrogen purification is another significant feature of the present invention. In conventional processes, the raw stream would typically undergo treatment with an amine solution, followed by a methanation process, followed by a copper liquor washing process and, finally, followed by a molecular sieve dryer process.

As shown in FIG. 1, two effluent streams emerge from the PSA unit. One of the streams is a reject gas which includes the separated impurities, such as $N_2$, $CO_2$, $CO$, $CH_4$, $NH_3$, and $H_2S$. Also included in the reject gas stream is the balanced amount of unrecovered $H_2$.

The second stream emerging from the PSA unit is high purity hydrogen. The hydrogen produced by the process of this invention is at least about 99 percent pure and, more typically, is 99.9 percent pure. The high purity hydrogen produced is recovered using conventional means and can be used in a variety of applications. These include, but are not limited to, hydrotreating, hydroprocessing, hydrocracking, methanol production, oxoalcohol production, isomerization processes, products produced via a Fisher-Tropsch type procedure, etc.

The process of this invention includes additional embodiments which essentially involve the optional treatment and/or use of the reject gas exiting the PSA unit. It is to be understood that in each of the additional embodiments described below, practice of the invention includes the process steps described above.

In one such additional embodiment, the reject gas is recycled to the shift converter to enhance the recovery of hydrogen. This embodiment can enhance the recovery of hydrogen by about 5 to about 15 percent. In particular, referring to FIG. 2, the reject gas exiting the PSA unit is first fed to an acid gas removal unit to recover carbon dioxide as a by-product and hydrogen sulfide prior to entering the CO shift converter. Acid gas removal can be effectuated by the well known Benfield Process or amine solution processes, where the operative amine solutions include, by way of illustration, monoethanolamine (MEA), diethanolamine (DEA) or Selexol, a polyethoxyether. A portion of the reject gas from the acid gas removal unit is boosted in pressure in a pressure booster and then directed into the shift converter, either by introducing it into the syngas feed stream (as shown) or, alternatively, by directly introducing it into the shift converter. In any event, the objective is to permit the reject gas to co-mingle with the synthesis gas mixture so that the reject gas is permitted to react with the steam in the shift converter to convert carbon monoxide present in the reject gas into the raw gas mixture described above.

Inasmuch as it is necessary to provide a means to remove inert gases, such as nitrogen, from the system, part of the reject gas from the acid gas scrubber is drawn off as shown at stream (H). Since this stream contains essentially only methane, carbon monoxide and hydrogen in addition to nitrogen, it is clean burning fuel.

The amount of clean burning fuel stream (H) which can be used as fuel is dependent on the amount of nitrogen present. It is to be noted that the heating value of the bleed gas (stream (H)) needs to be maintained at not less than 150 Btu/SCF, preferably 250 Btu/SCF to produce a good quality fuel. Generally, sufficient acid gas scrubber reject gas should be drawn off to keep the nitrogen content below 30 percent. Removal of the acid gases, in particular the carbon dioxide, prior to diversion to fuel greatly improves the heating quality of the gas, as well as improve recovery of hydrogen from that portion of the acid gas scrubber reject gas reinjected into the carbon monoxide shift converter feed.

In a second alternative embodiment, the reject gas is directed from the purification unit (e.g., PSA unit) to a burner where it can be used as a fuel source to preheat feedstreams to the partial oxidation unit or to the carbon monoxide shift unit or for any other processing units in the installation. From the environmental perspective, the reject gas from the PSA unit is a favorable fuel source, since it is completely devoid of olefins and other unsaturates. Accordingly, the flame it produces when heated does not produce environmentally unacceptable levels of soot.

In a third alternative embodiment, the PSA unit reject gas is treated to remove hydrogen sulphide which can subsequently be processed to obtain elemental sulphur. This embodiment is particularly beneficial where there are relatively considerable amounts of hydrogen sulphide in the gas feed. The hydrogen sulphide can be removed from the PSA unit reject stream in any known manner. One way of effectuating its removal includes directing the reject stream through an acid-gas scrubber to remove any hydrogen sulphide from the reject stream.

The removal of hydrogen sulphide from the PSA unit reject gas is preferred over removing it from the gas feed. Where sulphur is present in the original feed, it is usually combined in part with organic matter, making its removal more difficult than it would be to remove hydrogen sulphide from the PSA via acid gas scrubbing. The sequence of gasification followed by conversion shifting makes sulphur more available by acid gas extraction.

Elemental sulphur can be produced in any known manner; oxidation processes, such as the Claus system, are generally preferred.

The following examples are offered to further illustrate the manner and means for practicing certain embodiments of the present invention.

EXAMPLE I

This example is offered to illustrate a preferred manner of practicing the process of the present invention without the optional recycle step. In Table III, preferred pressure, temperature and flow rate parameters are provided for each of the gas streams involved in the process. In Table IV, the components which are included in each gas stream are provided in moles on a dry basis. In both Table III and Table IV, each gas stream is represented by a written character as follows:

A—offgas feed entering the partial oxidation unit
B—gas effluent from the partial oxidation unit (primarily syngas) which enters the shift converter
C—gas effluent from the shift converter which enters the purifier (e.g., PSA Unit)
D—high purity $H_2$ stream from the purifier
E—reject gas stream (tail gas) from the purifier

TABLE III

| Parameters | Gas Streams | | | | |
|---|---|---|---|---|---|
| | A | B | C | D | E |
| Pressure (psig) | 1100 | 1025 | 960 | 950 | 15 |
| Temperature (°F.) | 600 | 650 | 100 | 110 | 90 |
| Flow (mmscfd) | 12.4 | 39.0 | 52.0 | 30 | 22.0 |

TABLE IV

| Component | Gas Streams | | | | |
|---|---|---|---|---|---|
| | A | B | C | D | E |
| $H_2$ | 0 | 60.41 | 70.27 | 99.90 | 29.80 |
| $N_2$ | 0.4 | 0.13 | 0.1 | 0.10 | 0.20 |
| $CH_4$ | 82.60 | 0.4 | 0.3 | — | 0.70 |
| $C_2H_6$ | 8.61 | — | — | — | — |
| $C_3H_8$ | 3.80 | — | — | — | — |
| $C_4H_{10}$ | 1.91 | — | — | — | — |
| $C_5+$ | 0.92 | — | — | — | — |
| CO | — | 36.89 | 2.76 | 10 ppm (max) | 6.50 |
| $CO_2$ | 1.76 | 2.05 | 26.57 | — | 62.80 |
| $H_2S$ | 50 ppm (max) | 16 ppm | 12 ppm | — | 28 ppm |
| $H_2O$ | unsat.d | sat.d | sat.d | dry | sat.d |

EXAMPLE II

This example is offered to illustrate a preferred manner of practicing an alternative embodiment of the process of this invention which includes the optional step of recycling the reject gas from the PSA unit through an acid gas removal unit and then into the syngas stream before it enters the shift converter, to enhance the recovery of $H_2$. Tables V and VI show the operating parameters and the components concentration in moles on a dry basis, respectively. Streams A–E are the same as used in Tables III and IV. In Tables V and VI, gas streams F, G and H are representative of the following:

F—carbon dioxide stream from the acid gas removal unit
G—slipstream effluent from the $CO_2$ removal unit which re-enters the shift converter along with uncovered syngas
H—bleed stream of offgas effluent from the $CO_2$ removal unit taken to control buildup of inerts (nitrogen) in system, used as clean burning fuel

TABLE V

| Parameters | Gas Streams | | | | | | | |
|---|---|---|---|---|---|---|---|---|
| | A | B | C | D | E | F | G | H |
| Pressure (psig) | 1100 | 1025 | 960 | 950 | 15 | 15 | 1025 | 15 |
| Temperature (°F.) | 600 | 650 | 100 | 110 | 90 | 90 | 100 | 100 |
| Flow (mmscfd) | 11.0 | 34.8 | 53.2 | 30 | 23.2 | 13.7 | 5.0 | 4.5 |

TABLE VI

| Components | Gas Streams | | | | | |
|---|---|---|---|---|---|---|
| | A | B | D | E | F | G & H |
| $H_2$ | 0 | 60.41 | 99.90 | 33.6 | — | 82.4 |
| $N_2$ | 0.4 | 0.13 | 0.10 | 0.3 | — | 0.8 |
| $CH_4$ | 82.60 | 0.4 | — | 1.0 | — | 2.4 |
| $C_2H_6$ | 8.61 | — | — | — | — | — |
| $C_3H_8$ | 3.80 | — | — | — | — | — |
| $C_4H_{10}$ | 1.91 | — | — | — | — | — |
| $C_5+$ | 0.92 | — | — | — | — | — |

TABLE VI-continued

| Com-po-nents | Gas Streams | | | | | | |
|---|---|---|---|---|---|---|---|
| | A | B | C | D | E | F | G & H |
| CO | — | 36.89 | — | 10 ppm (max) | 5.9 | — | 14.4 |
| $CO_2$ | 1.76 | 2.05 | — | — | 59.2 | 100 | — |
| $H_2S$ | 50 ppm (max) | 16 ppm | 10 ppm | — | 24 ppm | 40 ppm | — |
| $H_2O$ | unsat.d | sat.d | sat.d | dry | sat.d | — | — |

We claim:

1. A process for producing high purity hydrogen consisting essentially of (1) partially oxidizing a gaseous hydrocarbonaceous feedstock other than refinery offgas at a temperature of about 2200° F. to about 2800° F. and in the absence of a catalyst, to produce a synthesis gas mixture of carbon monoxide and hydrogen, said feedstock having a major component which includes at least one $C_1$-$C_3$ hydrocarbon and said major component having an average molecular weight of up to about 30, (2) reacting said synthesis gas mixture with steam to convert said carbon monoxide into a raw gas mixture which primarily includes carbon dioxide and hydrogen, and (3) subjecting said raw gas mixture to pressure swing adsorption to purify said raw gas mixture, thereby producing high purity hydrogen and a reject gas mixture of impurities.

2. The process of claim 1 wherein said feedstock is natural gas.

3. The process of claim 1 which further comprises preheating said feedstock to a temperature of about 200° F. to about 700° F. prior to the step of partially oxidizing said feedstock.

4. The process of claim 1 wherein said feedstock is partially oxidized by introducing said feedstock into a partial oxidation unit at a rate of about 4 million to about 40 million standard cubic feet per day, said unit including a means for receiving oxygen into said unit to permit the oxidation of said feedstock.

5. The process of claim 4 wherein said oxygen is employed in said partial oxidation unit at a consumption rate of between about 115 tons per day to about 1400 tons per day.

6. The process of claim 4 wherein said partial oxidation unit comprises a gasifier.

7. The process of claim 6 wherein said feedstock is partially oxidized in said gasifier at a pressure of about 200 psig to about 1200 psig.

8. The process of claim 6 wherein said feedstock remains in said partial oxidation unit to produce said synthesis gas mixture for about 2 to about 4 seconds.

9. The process of claim 1 wherein said synthesis gas mixture is produced in an amount of at least about 2 to about 3 moles of synthesis gas per mole of said feedstock.

10. The process of claim which further comprises quenching said synthesis gas mixture prior to performing step (2).

11. The process of claim 1 wherein said synthesis gas mixture comprises at least about 59 percent by volume hydrogen and at least about 30 percent by volume carbon monoxide.

12. The process of claim 1 wherein the steam employed in step (2) is generated by quenching the product resulting from the partial oxidation of said feedstock.

13. The process of claim 1 whereby at least about 90 percent of said carbon monoxide is converted into said raw gas mixture.

14. The process of claim 1 wherein the conversion of carbon monoxide into said raw gas mixture occurs in two stages.

15. The process of claim 14 wherein the reaction occurring in the first stage takes place at a temperature of about 600° F. to about 1000° F. and the reaction occurring in the second stage takes place at a temperature of about 500° F. to about 800° F.

16. The process of claim 14 wherein the reaction occurring in the first stage takes place at a temperature of about 850° F. and the reaction occurring in the second stage takes place at a temperature of about 650° F.

17. The process of claim 1 wherein said raw gas mixture includes up to about 71 percent hydrogen and no more than about 26 percent carbon dioxide.

18. The process of claim 1 wherein said high purity hydrogen is at least about 99 percent pure.

19. The process of claim 1 which further comprises recycling said reject gas mixture of impurities in a manner such that said reject gas mixture co-mingles with said synthesis gas mixture, whereby said reject gas mixture is permitted to react with steam to convert any excess carbon monoxide remaining in said reject gas mixture into hydrogen and carbon dioxide, thereby enhancing the production of high purity hydrogen.

20. The process of claim 19 which further comprises recovering a substantial amount of carbon dioxide present in said reject gas mixture prior to the step of recycling said reject gas mixture, in order to maximize the conversion of said excess carbon monoxide.

21. The process of claim 1 which further comprises directing said reject gas mixture to a burner to enable said heated reject gas mixture to be used as a fuel source.

22. The process of claim 1 which further comprises recovering a substantial amount of hydrogen sulphide present in said reject gas mixture and processing said hydrogen sulphide to produce elemental sulphur.

23. The process of claim 22 wherein said amount of hydrogen sulphide is recovered by directing said reject gas mixture through an acid-gas scrubber in a manner such that said hydrogen sulphide is removed from said reject gas mixture.

24. A process for producing a pressurized, high purity hydrogen product consisting essentially of the steps of: (1) pressurizing a gaseous hydrocarbonaceous feedstock other than refinery offgas to a pressure slightly above the desired pressure of the hydrogen product, said feedstock having a major component which includes at least one $C_1$-$C_3$ hydrocarbon and said major component having an average molecular weight of up to about 30; (2) partially oxidizing said feedstock at a temperature of about 2200° F. to about 2800° F. and in the absence of a catalyst to produce a synthesis gas mixture of carbon monoxide and hydrogen; (3) reacting said synthesis gas mixture with steam to convert said carbon monoxide into a raw gas mixture which primarily includes carbon dioxide and hydrogen; and (4) subjecting said raw gas mixture to pressure swing adsorption to purify said raw gas mixture thereby producing said pressurized, high purity hydrogen and a reject gas mixture of impurities.

25. The process of claim 24 wherein said feedstock is natural gas.

26. The process of claim 24 wherein said feedstock is partially oxidized at a pressure of about 200 psig to about 1200 psig.

27. The process of claim 24 wherein said synthesis gas mixture is produced in an amount of at least about 2 to about 3 moles of synthesis gas per mole of said feedstock.

28. The process of claim 24 wherein the steam employed in step (3) is generated by quenching the product resulting from the partial oxidation of said feedstock.

29. The process of claim 24 wherein said raw gas mixture includes up to about 71 percent hydrogen and no more than about 26 percent carbon dioxide.

* * * * *